(12) United States Patent
Miller et al.

(10) Patent No.: US 8,714,557 B2
(45) Date of Patent: May 6, 2014

(54) MECHANICAL FACE SEAL HOUSING WITH SPRING WALL

(75) Inventors: Jonathan L. Miller, East Hampton, CT (US); Michael George Hilldoerfer, Mountain View, CA (US)

(73) Assignee: United Technologies Corporation, Hartford, CT (US)

( * ) Notice: Subject to any disclaimer, the term of this patent is extended or adjusted under 35 U.S.C. 154(b) by 1105 days.

(21) Appl. No.: 11/262,313

(22) Filed: Oct. 28, 2005

(65) Prior Publication Data

US 2007/0096398 A1    May 3, 2007

(51) Int. Cl.
*F16J 15/44*    (2006.01)

(52) U.S. Cl.
USPC ............................ 277/377; 277/373; 277/372

(58) Field of Classification Search
USPC .......................... 277/370, 372, 373, 375, 377
See application file for complete search history.

(56) References Cited

U.S. PATENT DOCUMENTS

| | | | |
|---|---|---|---|
| 2,990,202 A * | 6/1961 | Dennison | 277/399 |
| 4,406,459 A | 9/1983 | Davis et al. | |
| 4,406,460 A | 9/1983 | Slayton | |
| 4,502,856 A * | 3/1985 | Frank | 418/137 |
| 4,752,077 A * | 6/1988 | Hoffelner | 277/367 |
| 4,928,978 A | 5/1990 | Shaffer et al. | |
| 4,934,254 A * | 6/1990 | Clark et al. | 277/406 |
| 5,284,347 A * | 2/1994 | Pope | 277/305 |
| 5,464,227 A * | 11/1995 | Olson | 277/400 |
| 5,498,139 A * | 3/1996 | Williams | 415/173.7 |
| 5,639,096 A * | 6/1997 | Ullah | 277/401 |
| 2003/0184022 A1* | 10/2003 | Brauer et al. | 277/412 |

\* cited by examiner

*Primary Examiner* — Gilbert Lee
(74) *Attorney, Agent, or Firm* — Carlson, Gaskey & Olds P.C.

(57) ABSTRACT

A mechanical face seal housing includes an annular seal-receiving section, a seal force transfer section that extends axially from the annular-seal receiving section, and an annular contact section axially spaced from the seal-receiving section. An annular spring between the contact section and a support wall provides a bias force against the contact section. The contact section transfers the bias force to the seal-receiving section to provide a sealing force between a graphitic carbon ring and a rotatable seal surface.

24 Claims, 2 Drawing Sheets

MECHANICAL FACE SEAL HOUSING WITH SPRING WALL

BACKGROUND OF THE INVENTION

This invention relates to mechanical face seals and, more particularly, to a simplified mechanical face seal arrangement that eases assembly and utilizes fewer parts than conventional shaft seal assemblies.

Conventional mechanical face seals are used in rotating equipment, such as gas turbine engines, to provide a fluid seal between regions of high and low fluid pressure. For example, mechanical face seals are used for sealing a rotating shaft on a pump, compressor, agitator, gas turbine, or other rotating equipment. In gas turbine engines, mechanical face seals are used to prevent hot, high pressure air from entering a bearing compartment that operates at a lower pressure and temperature.

A conventional metal-backed face seal arrangement for a gas turbine engine includes an annular graphitic carbon ring secured to a rotationally static, axially translatable, annular metal seal housing. A seal seat is affixed to a rotatable engine main shaft and positioned axially adjacent to the graphitic carbon ring. A nose of the annular graphitic carbon ring is urged into contact with the seal seat by a combination of spring forces acting on the seal housing and the net resultant of axially opposing fluid pressure forces. The contact between the nose and the seal seat resists fluid leakage across the seal arrangement in the radial direction.

Typically, a conventional graphitic carbon ring mechanical face seal arrangement includes between six and twelve spring guides affixed to a non-rotatable support or seal housing. The seal housing axially translates along the spring guides. A coil spring is arranged coaxially about each spring guide between the seal housing and the support to provide a bias force that urges the graphitic carbon ring into contact with the seal seat. Disadvantageously, the six to twelve spring guides and six to twelve corresponding coil springs are time consuming to install and add expense to the arrangement. Functionally, the seal seat limits movement of the seal arrangement in one axial direction, however, only the support limits movement in the opposite direction. This may undesirably damage the support and seal arrangement, or over-compress and over-stress one or more of the coil springs.

Accordingly, there is a need for a simplified and robust gas turbine engine shaft seal arrangement that is easy to install and has relatively few parts.

SUMMARY OF THE INVENTION

The mechanical face seal housing according to the present invention includes an annular seal section, a force transfer section that extends axially from the annular seal section, and a contact section that is axially spaced form the seal section. The contact section, such as the seal housing spring wall, is spaced from a support wall. An annular spring is located between the contact section and the support wall for providing a bias force to the contact section. The contact section transfers the bias force to the force transfer section and seal section to provide a sealing force between an annular seal and a rotating surface.

One exemplary mechanical face seal arrangement according to the present invention includes a support, guide members secured to the support, and a seal member having a guide slots that cooperate with the guide members to define a direction of seal member movement. An annular bias member between the support and the seal member biases the seal member toward a rotating surface.

Accordingly, the inventive mechanical face seal provides a simplified and robust seal arrangement that biases the seal member at the contact section of the seal housing.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
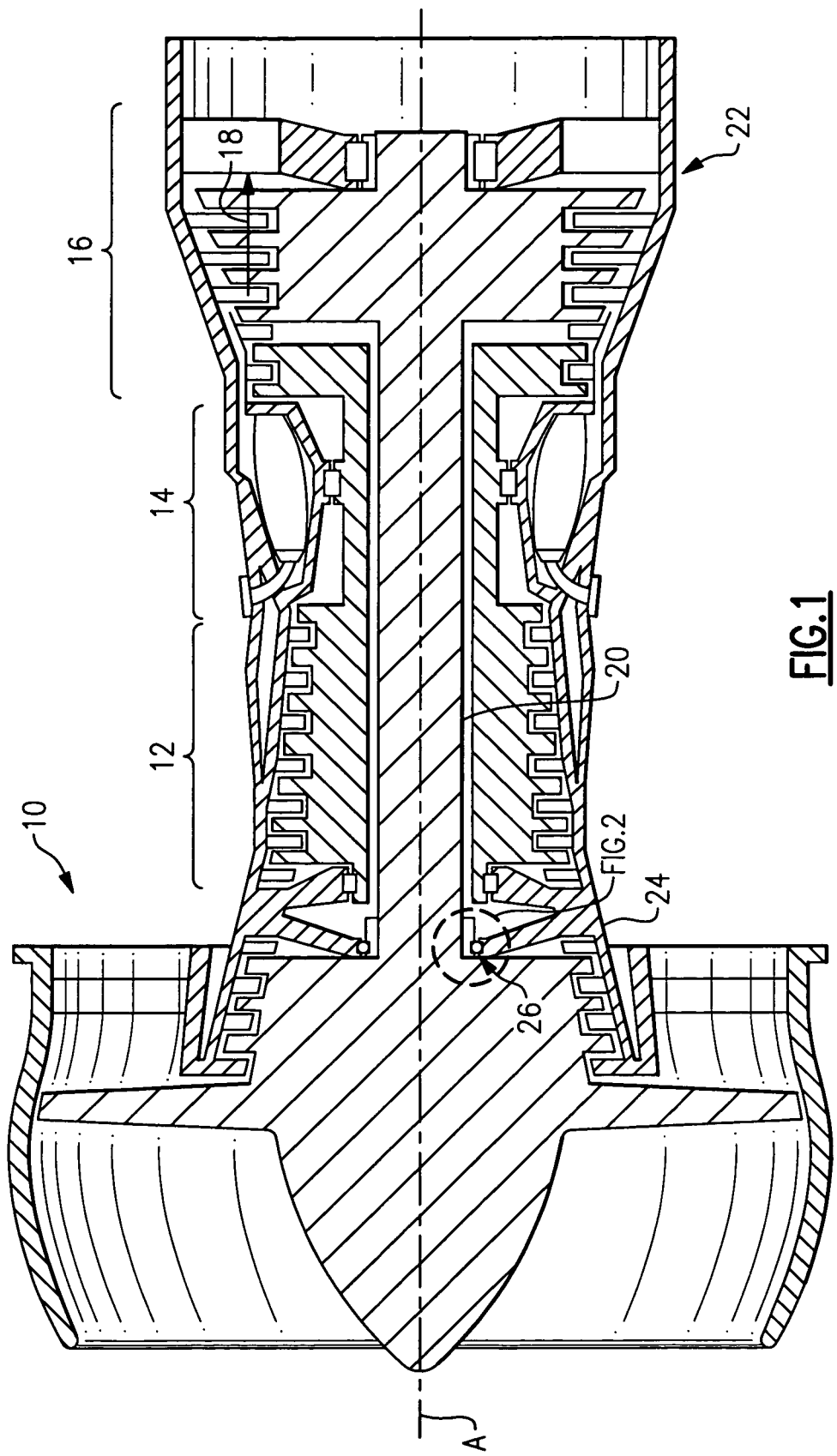
FIG. 1 shows an example gas turbine engine.

FIG. 1 illustrates selected portions of an example rotational assembly 10, such as a gas turbine engine for an aircraft. In this example, the rotational assembly 10 includes a compressor section 12, a combustor section 14, and a turbine section 16. The rotational assembly 10 operates in a known manner, feeding compressed air from the compressor section 12 to the combustor section 14. The compressed air is mixed with fuel and reacts to produce a flow of hot gases 18. The turbine section 16 transforms the flow of hot gases 18 into mechanical energy to rotationally drive a shaft 20, such as a turbine engine main shaft. The shaft 20 is coupled with the turbine section 16 and the compressor section 12 such that the turbine section 16 drives the compressor section 12. An exhaust nozzle 22 directs the hot gases 18 out of the rotational assembly 10. A case 24 provides support for the shaft 20 on a bearing arrangement 26, such as a No. 1 bearing.

Figure 2:
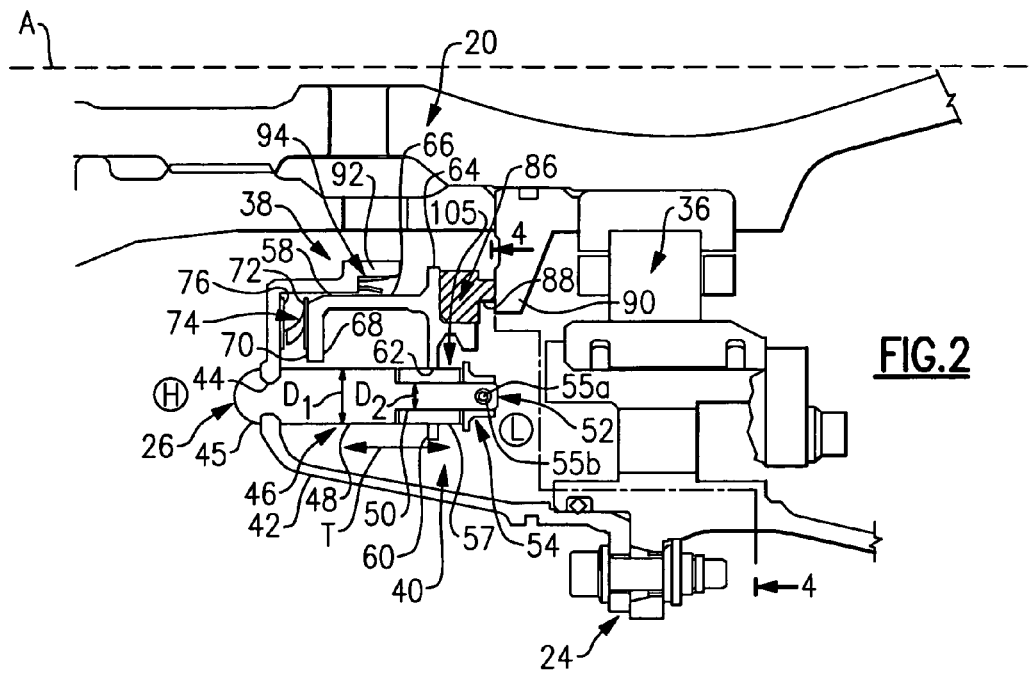
FIG. 2 shows a more detailed view of the bearing arrangement shown in FIG. 1, including a seal arrangement.

FIG. 2 shows a more detailed view of the bearing arrangement 26 shown in FIG. 1. The bearing arrangement 26 includes a bearing 36 mounted between the case 24 and the shaft 20 that provides support for the shaft 20, which rotates about a central axis A. A seal arrangement 38 provides a fluid restriction between a low pressure and temperature (L) bearing chamber 40 and hot, high pressure (H) region outside of the bearing chamber 40.

A support wall 42 includes circumferentially spaced openings 44. Each of the guide members 46, such as a stop pin, includes a head 45 that engages a corresponding opening 44 of the support wall 42 to secure the guide member 46 to the support wall 42. In the illustrated example, an interference fit between the head 45 and the corresponding opening 44 provides a secure connection.

Each guide member 46 includes a base section 48 and a neck section 50. In this example, both the base section 48 and the neck section 50 are cylindrical and have respective diameters $D_1$ and $D_2$. The diameter $D_1$ of the base section 48 is larger than the diameter $D_2$ of the neck section 50. A distal end 52 of the neck section 50 receives a retaining collar 54. The distal end 52 and retaining collar 54 have respective openings 55a and 55b and a fastener F (FIG. 3) is disposed through the openings 55b and 55a to secure the retaining collar 54 on the distal end 52. A spacer sleeve 57 mounts on the neck section 50 of each of the guide members 46. Optionally, spacer sleeves 57 are used only on some of the guide members 46 to further reduce the number of parts in the assembly.

The guide members 46 support a seal housing 58, which includes a flange 60 that extends in a radial direction relative to the axis A. The flange 60 includes guide slots 62 that cooperate with corresponding spacer sleeves 57 to axially guide the seal housing 58. The flange 60 extends from a seal-receiving section 64 of the seal housing 58. A seal housing bore section 66 (one example force transfer section) extends axially from the seal-receiving section 64. A contact section 68 extends radially from and is cantilevered from the seal housing bore section 66. In one example, the seal-receiving section 64, seal housing bore section 66, and contact section 68 are integrally formed as a single component.

An axial surface 70 of the contact section 68 includes a wear layer 72 for contact with an annular spring 74. Alternatively, a plurality of coil springs or other types of bias members are used. The support wall 42 also includes a wear layer 76 adjacent to the annular spring 74. The wear layers 72 and 76 provide the benefit of protecting the axial surface 70, support wall 42, and annular spring 74 from wear. In one example, the wear layers 72 and 76 include a coating that is harder than the metal substrate of the respective contact section 68 and support wall 42. The annular spring 74, contact section 68, and support wall 42 may also include a hard coating for wear resistance.

The seal-receiving section 64 includes an annular graphitic carbon ring 86 that is interference fit into the seal-receiving section 64. The graphitic carbon ring 86 includes a nose 88 that contacts seal seat 90 when the seal housing 58 is in a sealing position. In this example, the graphitic carbon ring 86 is somewhat radially aligned (i.e., axially offset) with the annular spring 74. The seal seat 90 rotates with the shaft 20, while the seal arrangement 38 remains static with the case 24.

The support wall 42 includes a seal groove 92 and corresponding seal 94 located radially inward of the seal housing bore section 66. In this example, the graphitic carbon ring 86 may be referred to as a primary seal of the bearing chamber 40 and the seal 94 may be referred to as a secondary seal that radially seals the seal arrangement 38.

The seal 94 contacts the seal housing bore section 66 of the seal housing 58 to resist fluid leakage across in the axial direction, as the seal member translates axially. The seal 94 is resilient such that the seal 94 maintains a radial bias force against the seal housing bore section 66. Optionally, the seal housing bore section 66 includes a hard coating that extends along at least a portion of the seal housing bore section 66 for enhanced wear resistance. In one example, the seal 94 is made of a durable, low-friction material, such as polytetrafluoroethylene.

During operation of the rotational assembly 10, the net resultant of axially opposing fluid pressure forces and the annular spring 74 provide a bias force on the seal housing 58 to urge the graphitic carbon ring 86 into sealing contact with the seal seat 90, which rotates during operation. The annular spring 74 provides a bias force against the wear layer 72 of the contact section 68, which transfers the force to the seal housing bore section 66 and seal-receiving section 64. The bias force urges the seal housing 58 toward the seal seat 90 to provide a seal between the graphitic carbon ring 86 and the seal seat 90.

Figure 3:
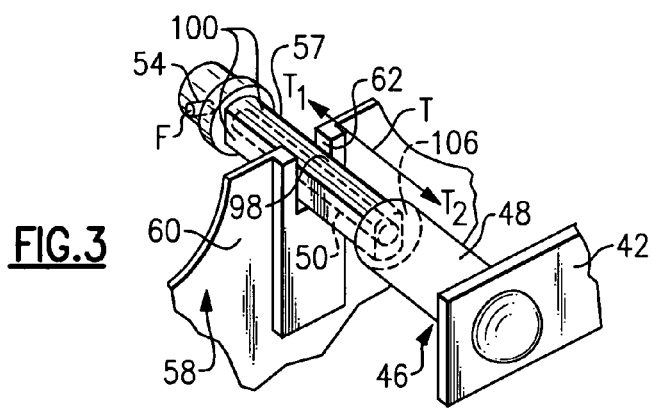
FIG. 3 shows a isometric projected view of an example guide member of the seal arrangement shown in FIG. 2.

Referring to FIG. 3, the guide member 46 axially guides movement of the seal member along a translation direction T via engagement with the spacer sleeve 57 and flange 60 of the seal housing 58. The spacer sleeve 57 includes rounded sides 98 and flat sides 100. The flat sides 100 correspond to the flat sides of the guide slot 62. The spacer sleeves 57 provide smooth movement of the seal housing 58 along the guide member 46 and reduce friction and wear between the seal housing 58 and neck section 50.

The retaining collar 54 secured on the neck section 50 functions as a stop to prevent the seal housing 58 from moving beyond the retaining collar 54 in the direction $T_1$. The difference in diameter between the base portion 48 and the neck portion 50 provides a stop 106 that stops the seal housing 58 from moving in the direction $T_2$. Thus, the retaining collar 54 and stop 106 define a range of movement of the seal housing 58. This provides the benefit of protecting the annular spring 74 from being over-compressed if the seal housing 58 moves too far in the direction $T_2$, which is a concern with prior shaft seal arrangements.

In the illustrated example, there is a space 105 (FIG. 2) between the retaining collar 54 and the flange 60. The space 105 allows the nose 88 of the graphitic carbon ring 86 to contact the seal seat 90. As the nose 88 wears, the space 105 decreases. If the nose 88 wears an amount that is greater than the size of space 105, the retaining collar 54 prevents the graphitic carbon ring 86 from further wear against the seal seat 90, which may otherwise result in damage to the seal arrangement 38. The size of the space 105 may be predetermined in a design stage of the seal assembly 38 and may vary with design.

Figure 4:
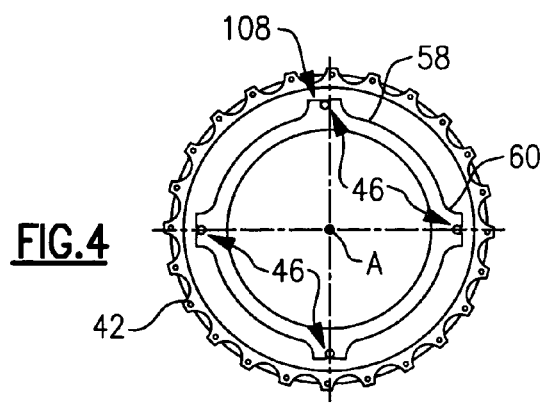
FIG. 4 shows an axial view of example guide member circumferential locations of the seal arrangement shown in FIG. 2.

FIG. 4 is an axial view of portions of the seal arrangement 38 according to the section shown in FIG. 2 (but showing the entire circumference). The seal housing 58 mounts on the guide members 46 at four circumferential locations, for example. One location 108 is slightly off-center to ensure that the seal arrangement 38 is installed in a desired orientation.

Incorporation of the contact section 68 feature into the seal housing 58 enables use of an arrangement that utilizes the annular spring 74 and guide members 46. Utilizing the annular spring 74 eliminates the six to twelve individual coil springs and spring guides known in prior arrangements. The guide members 46 allow axial guidance of the seal housing 58, proper orientation of the seal arrangement 38, and anti-rotation of the primary seal in addition to protecting the annular spring 74 from being over-stressed or over-compressed. Thus the simplified arrangement eliminates parts, reduces expense, and provides a robust design.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A gas turbine engine mechanical face seal housing comprising:
    an annular seal-receiving section defining a center axis, the annular seal-receiving section including an annular flange that extends in a radially outward direction toward a free end relative to the center axis;
    a force transfer section that extends axially from the annular seal-receiving section;
    a contact section axially spaced from the annular seal-receiving section for receiving a bias force and transferring the bias force to the force transfer section, wherein the force transfer section is moveable relative to an axis of a gas turbine engine in response to the bias force; and
    an annular carbon seal mounted in the annular seal-receiving section facing away from the contact section.

2. The gas turbine engine mechanical face seal housing as recited in claim 1, including an annular space between the annular seal-receiving section and the contact section.

3. The gas turbine engine mechanical face seal housing as recited in claim 1, wherein the contact section extends in a radial direction from said force transfer section.

4. The gas turbine engine mechanical face seal housing as recited in claim 1, wherein the contact section is cantilevered from the force transfer section.

5. The gas turbine engine mechanical face seal housing as recited in claim 1, wherein the contact section includes a wear-resistant layer.

6. The gas turbine engine mechanical face seal housing as recited in claim 5, wherein the wear resistant layer is a hard coating having a first hardness, and the contact section has a second hardness that is less than the first hardness.

7. The gas turbine engine mechanical face seal housing as recited in claim 1, wherein the force transfer section includes a seal surface that faces in a radially inward direction relative the center axis.

8. The gas turbine engine mechanical face seal housing as recited in claim 1, wherein the annular flange includes guide slots there through.

9. The gas turbine engine mechanical face seal housing as recited in claim 1, wherein the seal-receiving section, force transfer section, and contact section form a U-shaped cross-sectional profile.

10. The gas turbine engine mechanical face seal housing as recited in claim 1, wherein the contact section is a spring wall having a spring face for receiving the bias force.

11. The gas turbine engine mechanical face seal housing as recited in claim 1, wherein the force transfer section includes a hard coating.

12. The gas turbine engine mechanical face seal housing as recited in claim 11, wherein the hard coating is disposed on a radially inner surface of the force transfer section relative to the center axis.

13. The gas turbine engine mechanical face seal housing as recited in claim 1, wherein the face seal housing is configured to axially translate relative to the axis of the gas turbine engine.

14. The gas turbine engine mechanical face seal housing as recited in claim 1, wherein the force transfer section is moveable relative to a guide member supporting the gas turbine engine mechanical face seal housing.

15. The gas turbine engine mechanical face seal housing as recited in claim 1, wherein the force transfer section moves relative to the axis of the gas turbine engine in response to the bias force.

16. A gas turbine engine mechanical face seal arrangement comprising:
a support;
a plurality of guide members secured to the support;
a seal member slidably received onto the plurality of guide members to establish a direction of seal member movement, the seal member including an annular seal-receiving section defining a center axis, the annular seal-receiving section including an annular flange that extends in a radially outward direction toward a free end relative to the center axis, a force transfer section that extends axially from the annular seal-receiving section, a contact section axially spaced from the seal-receiving section for receiving a bias force and transferring the bias force to the force transfer section, wherein the force transfer section is moveable relative to an axis of a gas turbine engine in response to the bias force, the contact section including a wear resistant coating adjacent an annular bias member, and an annular carbon seal mounted in the annular seal-receiving section facing away from the contact section; and
an annular bias member comprising a ring located between the support and contact section of the seal member.

17. The gas turbine engine mechanical face seal arrangement as recited in claim 16, wherein at least one of the plurality of guide members includes a stop for resisting movement of the seal member along the direction of seal movement.

18. The gas turbine engine mechanical face seal arrangement as recited in claim 16, wherein the seal member includes an annular seal mounted therein.

19. The gas turbine engine mechanical face seal arrangement as recited in claim 18, including a rotatable seal surface adjacent the annular seal.

20. The gas turbine engine mechanical face seal arrangement as recited in claim 16, wherein the ring is non-coiled.

21. The gas turbine engine mechanical face seal arrangement as recited in claim 16, wherein the wear resistant coating is a hard coating having a first hardness, and the contact section has a second hardness that is less than the first hardness.

22. The gas turbine engine mechanical face seal arrangement as recited in claim 16, wherein the annular bias member is axially aligned with the annular carbon seal.

23. The gas turbine engine mechanical face seal arrangement as recited in claim 16, wherein the seal member is configured to axially translate relative to the axis of the gas turbine engine.

24. The gas turbine engine mechanical face seal arrangement as recited in claim 16, wherein the force transfer section is moveable relative to a guide member supporting the gas turbine engine mechanical face seal housing.

* * * * *